Figure 1:
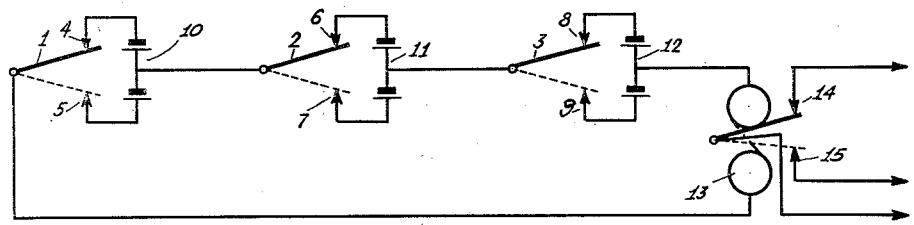

July 15, 1930.  A. JIPP  1,770,485
MEANS FOR NEUTRALIZING DISTURBANCES, ESPECIALLY
OF TELEGRAPH SIGNALS TRANSMITTED BY RADIO
Filed June 14, 1929

INVENTOR
AUGUST JIPP
BY
ATTORNEY

Patented July 15, 1930

1,770,485

UNITED STATES PATENT OFFICE

AUGUST JIPP, OF BERLIN-SPANDAU, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

MEANS FOR NEUTRALIZING DISTURBANCES, ESPECIALLY OF TELEGRAPH SIGNALS TRANSMITTED BY RADIO

Application filed June 14, 1929, Serial No. 370,917, and in Germany February 28, 1928.

This invention broadly relates to a radio transmitting and receiving system and more particularly to a method of substantially eliminating the effect of both positive and negative static at the receiving end.

The means disclosed in the prior art for the purpose of obviating disturbances of radio telegraphy signals are essentially predicated upon the fact that the signals are sent out repeatedly and are received by way of an aggregation or accumulation means which, even when only one of the incoming signals is correct, suppresses the disturbed or troubled signals, and causes the re-forwarding or feeding to the rest of the outfit of only the correct signal. However, this scheme is effective only in the case of one kind or type of possible disturbances, to be more precise, of the disturbances which change a "non-current impulse" signal into a "current impulse" signal. What is meant are the atmospheric disturbances or atmospherics hereinafter briefly called positive disturbances. Apart from this source of trouble in communication there arise others which change a current impulse into a non-current impulse as a result of fading and of irregularities in the transmitter and receiver outfit. This kind of trouble shall hereinafter be called negative disturbances. Upon the arising of this latter kind of trouble, the means hereinbefore referred to are ineffective so that, for eliminating the same, a device having an action contrary to that of known schemes has been suggested.

The object of this invention is an arrangement which, with the use of repeated transmission and reception of signals by way of accumulating and aggregating means, is adapted to eliminate both kinds of disturbances, in such a way that the majority incoming signal of a repeating period is fed on to the recording or translating devices.

For instance, the accumulation means may be furnished with a contact device which closes a circuit to energize a polarized electromagnet with the incidental result that it connects and renders operative electromotive forces respectively opposed to the dissimilarly or non-coincidentally arriving signals of a repetition period. For instance, if three current-impulse signals come in, then an electromotive force is connected which causes the flow through the polarized relay of a current of definite direction. Now, if among these signals there is a discrepant signal, in other words, a non-current impulse signal, then $\frac{1}{3}$ of the electromotive force previously applied is disconnected, and connected in the form of a counter electromotive force (c. electromotive force) in the circuit. The sense of flow of the current still remains the same, although the value or amplitude of the electromotive force has been reduced $\frac{2}{3}$. The polarized relay which must still respond to such minimum amount of potential, as a result reproduces the signal just the same as previously in the presence of the undiminished electromotive force. Upon the arrival of three wrong signals or also of two wrong signals, the direction of the current is reversed inasmuch as the c. electromotive force which is operative prevails or predominates. It will be evident that these actions are produced both in the presence of positive as well as of negative disturbances in an analogous manner, since the coming in, for instance, of two non-current impulses and a current-impulse, may mean not only a period of three disturbed current impulses, but also a period of three non-current impulses troubled by one current-impulse just the same as three non-current impulses may constitute a properly arriving or a completely disturbed period of three current impulses. However, since according to practical observations the probability for the occurrence of two disturbances inside one period referred to 1% amounts to only 1:160 and of three to as much as 1:100000, the safety insured by the novel arrangement is entirely adequate for practical requirements so much more so since now both sources of trouble are covered or embraced, and since the choice of the transmission wavelength is no longer confined to a wave-length range primarily affected by one type of disturbances.

Figure 2:
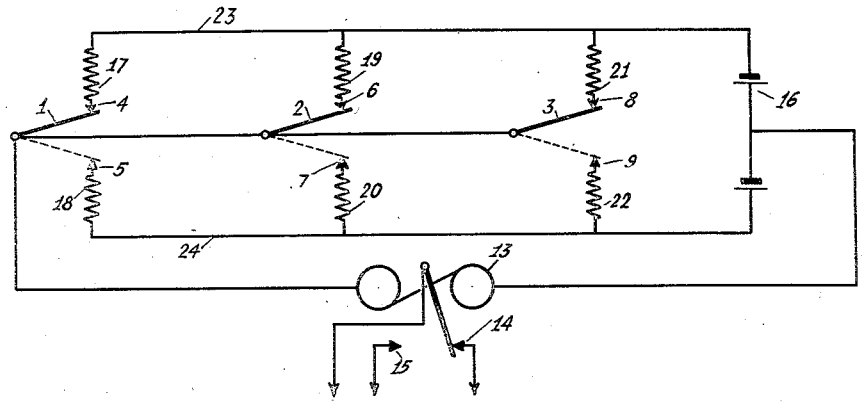
Figure 3:
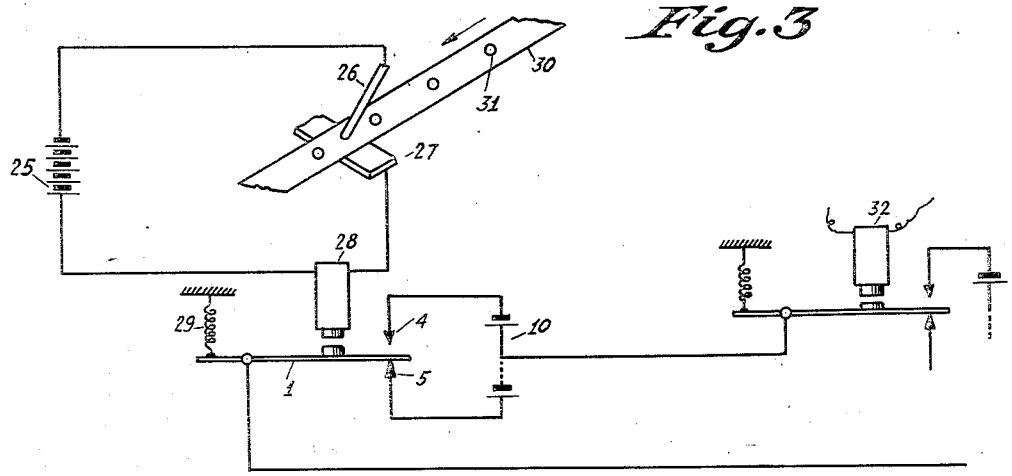

The invention is diagrammatically illustrated by way of example in the two embodiments shown in the drawings in which Figure 1 illustrates a preferred embodiment of my invention;

Figure 2 illustrates another form thereof in which only one polarizing battery is utilized; and Figure 3 illustrates a more complete showing of the invention in which the brush feelers and their relation to the other apparatus are emphasized.

Suppose that in the case here assumed, the accumulation or aggregation means is so designed that the signal repetitions are recorded upon three distinct perforation strips or tapes, and that the latter are conducted in synchronism over three tactile levers denoted by 1, 2, 3. The latter are united with two contacts each, i. e., 4, 5; 6, 7; and 8, 9; among these those denoted by 4, 6 and 8, shall be assumed to be the ones which are closed whenever each of the levers passes a hole in its tape. The two contacts belonging to a given tactile lever are associated by way of a source of current 10, 11 and 12, respectively. The middle of these current sources is united with a body contact of the next tactile lever. From the middle of source 12 a wire is brought by way of a suitably polarized relay 13 to the body of the tactile lever 1. The contacts of the relay shall be assumed to be united with a relay (not shown) belonging, for instance, to a translator device known from the operation of a Siemens high speed telegraph. It shall be assumed further that combinations comprising five signals are to be received which are transmitted consecutively, while each one of the signals is repeated three times.

Since the tactile-lever type of accumulation device serves for the repetition period of one of these five signals, the further supposition must be made that five such means are provided, a distributor device of known kind feeding the respective repetitions of each individual signal to each lever group. Hence, also five translator devices as in the standard known translator outfits are provided. Now, suppose a current-impulse signal is sent which corresponds to a perforation in the tape. The three tactile levers, if the thrice repeated signal arrives correctly, will coincidentally close the contacts 4, 6 and 8. As a result a circuit will be closed, that is to say, the three upper halves of the batteries, each of which is to supply, say, 2 v., are connected in series. Hence, the electromotive force setting up a current amounts to 6 v. The relay 13 is caused to respond and shifts its keeper, for instance, to contact 14. Now, if during the transmission of the repetitions, say, the middle signal has been suppressed, then upon the corresponding receiving tape no hole has been made, and when this tape passes through the tactile lever 2, the latter remains in bearing position and closes the contact 7. As result the lower half of the battery 11 is connected with opposite polarity and against the halves of batteries 10 and 12 in the circuit. The electromotive force which tends to place the lever or relay 13 against the contact 14, amounts then to 4 v., while the c. electromotive force of one-half of battery 11 amounts to 2 v. Hence, the resultant is 2 v. of a polarity causing relay 13 to close contact 14. Therefore, in accordance with the majority of incoming current-impulses, the relay 13 passes a current-impulse signal in spite of the fact that one of the signals has been turned into a non-current impulse.

If three non-current impulses are to be transmitted, then the tactile levers assume coincidentally positions as indicated by the dotted lines, and the relay is energized by a current flowing in the opposite direction with the result that its contact 15 is closed. Just as above described, the electromotive force amounts to 6 v. Upon the arrival of a non-current impulse disturbed by atmospherics and thereby changed into a current-impulse signal, the corresponding lever is changed into the current-impulse position and connects a c. electromotive force as above described. This c. electromotive force reduces the original electromotive force to 2 v. so that again the majority of non-current impulses occasions the feeding forward of a non-current impulse signal.

The equipment, of course, could be furnished also with condensers which influence and act upon the relay 13 according to the predominance of the charges. Repetition of the impulses furthermore may be effected also after production of a complete combination or even after still greater intervals.

Figure 2 shows the provision of opposite currents, the scheme comprising a joint battery 16. The tactile levers with their contacts, since they correspond exactly to those shown in Figure 1, are denoted by the same reference numerals. Connected with contacts 4—9 are equal resistances 17—22, of which three pertaining to the same kind of contacts are connected in parallel by a joint line 23 and 24, respectively. These two wires form branches of a circuit comprising relay 13 and the two parts of battery 16. In the position of the tactile levers indicated by solid lines, the resistances, 17, 19, 20 are connected in parallel, and a current flows through the wire 23, the upper part of battery 16 and relay 13. In the position of the levers shown by the dotted lines, a current flows through resistances 18, 19, 22 and the lower half of the battery in the contrary sense of the current which causes the relay keeper to shift into the dotted line position. Currents of different size and direction will be caused to flow by way of the relay in accordance with the different positions of the tactile levers just as in the case of the embodiment Figure 1.

In Figure 3, 30 represents the non-conductive tape with the signal records 31 thereon shown in the form of holes although it is to be understood that any type of recording well known in the art may be used such as for example, conducting ink and the like. Contact block 27, magnet 28, battery 25 and spring brush 26 form an electrical circuit. It can be seen that as the tape 30 moves in the direction of the arrow a hole will be brought directly under the brush 26 whereupon the circuit is completed since 26 will contact with 27. Magnet 28 is thus energized and arm 1 is moved upward against the action of spring 29 until contact is made with 4 and broken with 5. Any type of feeding may be provided as best suits the actual conditions. The remaining apparatus is identical with that shown in Figure 1. Of course, the same signal sensing means may be applied to Figure 2.

I claim:

1. In a device of the kind described, a plurality of mediums having signal records thereon, a corresponding number of feeler devices, means for passing said mediums through said feeler devices, an electrical circuit comprising a plurality of polarizing relays controlled by said feeler devices, a translating device in said electrical circuit and means controlled by said polarizing relays for affecting said translating device in accordance with the majority of similar signal records appearing simultaneously through said feeler devices.

2. In a device of the kind described, a plurality of recording mediums each thereof having signal records impressed thereon in accordance with signals received from a transmitting station transmitting the same signal a plurality of times one complete message as received therefrom being impressed on each of said mediums, an electrical circuit having a polarized relay device, polarizing devices connected in said circuit and adapted to control the flow of current therein in accordance with the polarity of the majority of said polarizing devices, a plurality of feeler devices adapted to sense the signal records on said recording mediums and means controlled thereby for affecting said polarizing devices.

3. Means for eliminating the effects of electrical disturbances both negative and positive in radio transmission which comprises transmitting the signal a plurality of times, receiving and storing said signals in an accumulation means, comparing corresponding signals and means controlled thereby affecting said accumulation means in accordance with the signals arriving in the majority.

4. In a system of the kind described, a plurality of mediums having signal records thereon, a corresponding number of feeler devices, means for passing said mediums adjacent said feeler devices, an electrical circuit comprising a plurality of polarizing relays controlled by said feeler devices said polarizing relays comprising a source of direct current energy and an armature adapted to contact with the positive side of said direct current source when certain conditions exist on said signal record and on the negative side of said source when other conditions exist on said signal record, a translating device in said electrical circuit and means controlled by said polarizing relays for affecting said translating device in accordance with the majority of similar signal records appearing simultaneously adjacent said feeler devices.

5. In a system of the kind described, a plurality of recording mediums each thereof having signal records impressed thereon in accordance with signals received from a transmitting station transmitting the same signal a plurality of times one complete message as received therefrom being impressed on one of said mediums, an electrical circuit comprising a polarized relay device, polarizing devices connected in said circuit and adapted to control the flow of current therein in accordance with the polarity of the majority of said polarizing devices each of said polarizing devices comprising a potentiometer device, a plurality of feeler devices adapted to sense the signal records on said recording mediums and means controlled thereby for affecting said polarizing devices.

AUGUST JIPP.